Figure 1:
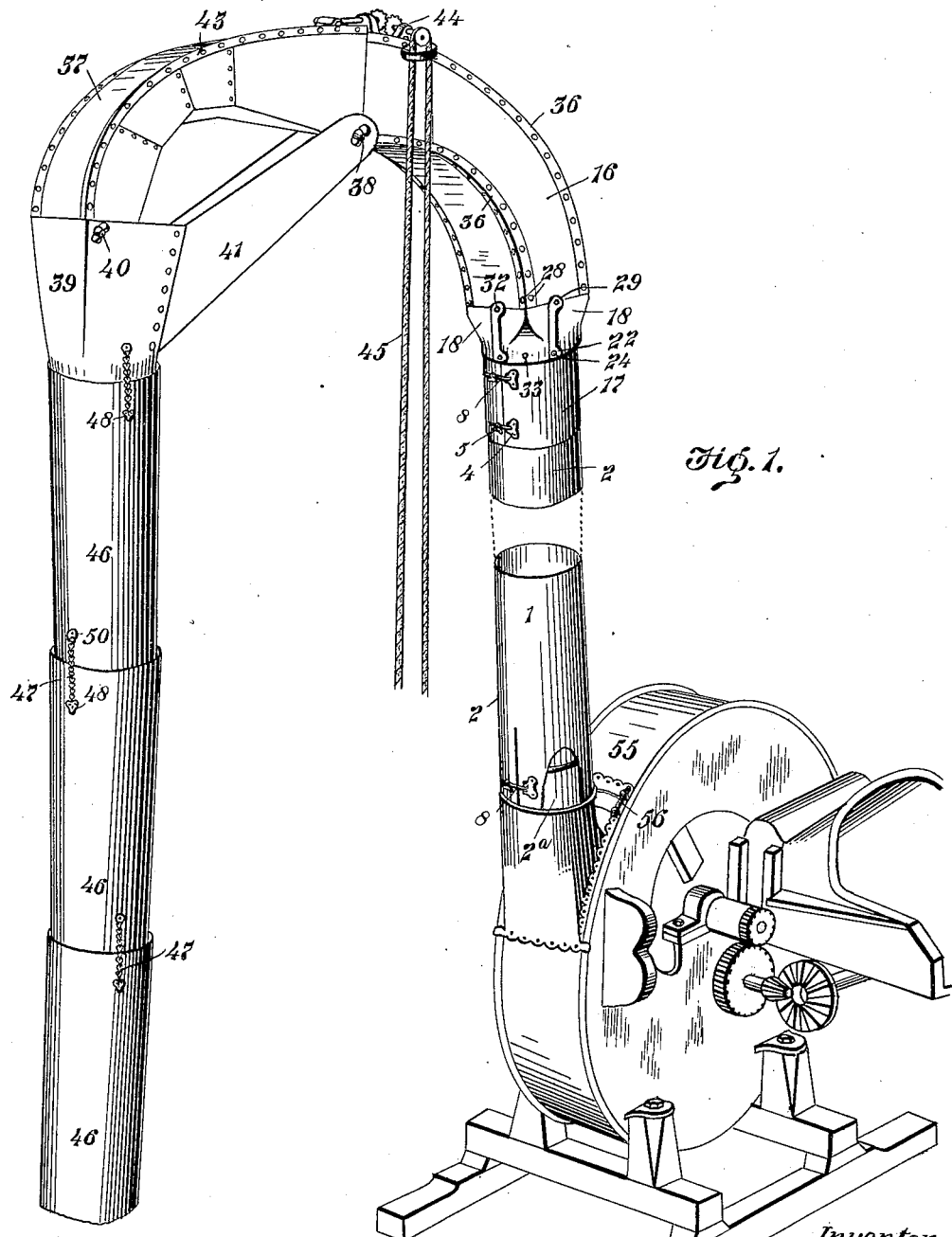

J. DICK.
FODDER CUTTER DISCHARGE PIPE.
APPLICATION FILED MAY 3, 1912.

1,100,959.

Patented June 23, 1914.
3 SHEETS—SHEET 1.

Witnesses:
J. H. Bishop
Ruth A. Miller

Inventor
Joseph Dick
By Harry Frease
Attorney

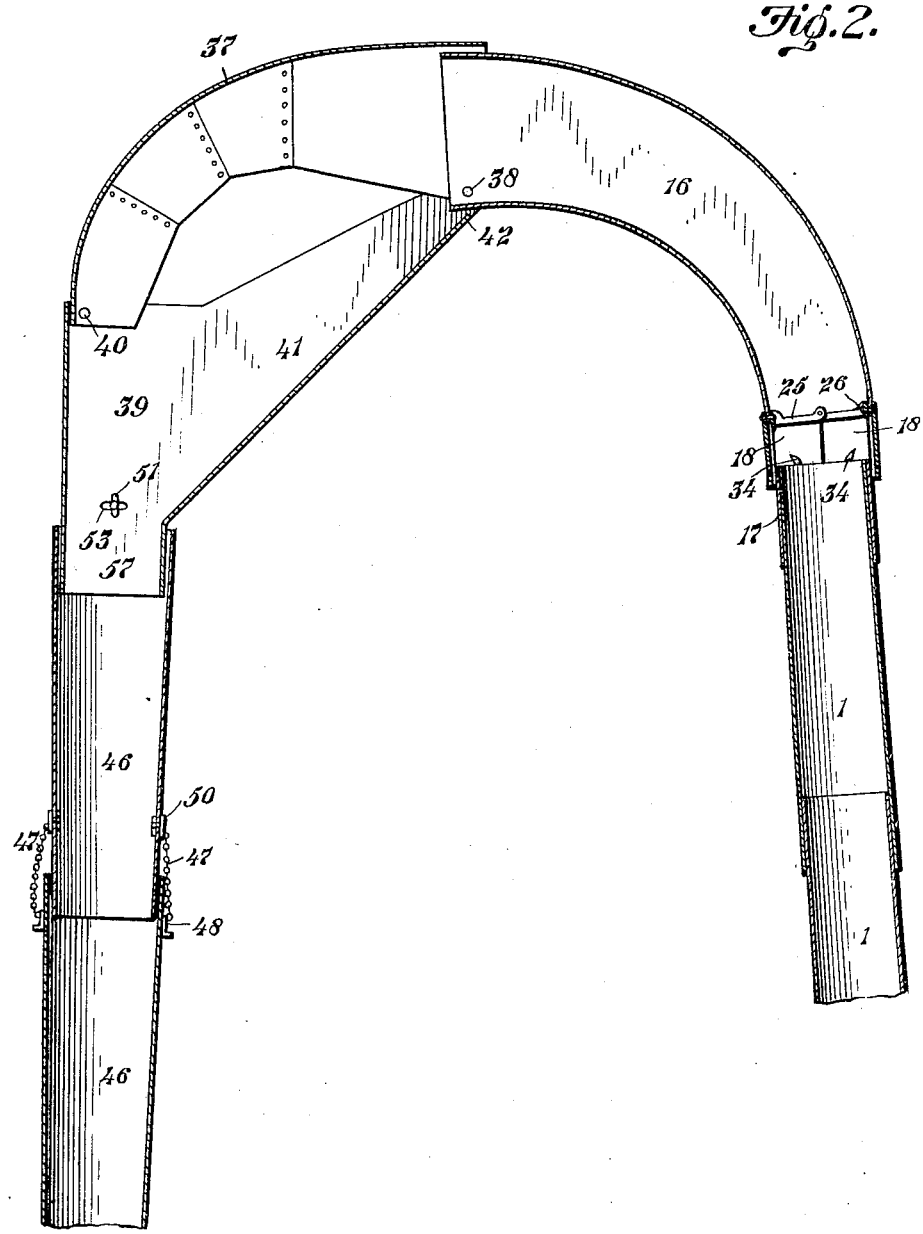

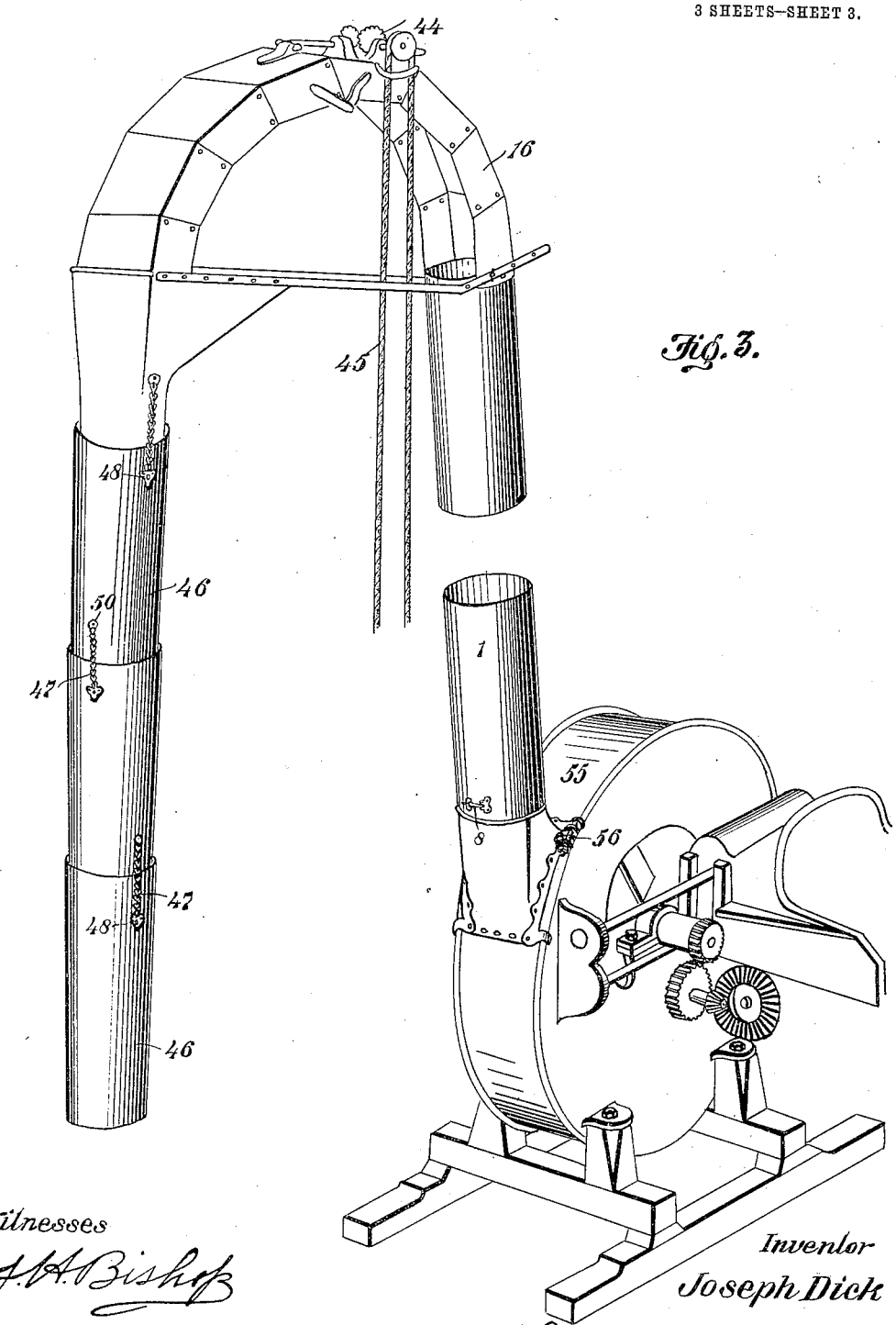

UNITED STATES PATENT OFFICE.

JOSEPH DICK, OF CANTON, OHIO.

FODDER-CUTTER DISCHARGE-PIPE.

1,100,959.  Specification of Letters Patent.  Patented June 23, 1914.

Application filed May 3, 1912. Serial No. 694,861.

*To all whom it may concern:*

Be it known that I, JOSEPH DICK, a citizen of the United States, residing at Canton, in the county of Stark and State of Ohio, have invented certain new and useful Improvements in Fodder-Cutter Discharge-Pipes, of which the following is a specification.

The invention relates to the discharge pipe leading from the blower of a fodder cutter or like machine for elevating the severed silage and discharging it into a silo, and includes improvements pertaining to the structure and shape of the deflector on the discharge pipe, which is designed to prevent a clogging of the silage when deflected laterally and also involves the use of a funnel hopper with a deflecting hood for positively catching and directing the silage into the discharge spout.

A preferred embodiment of the invention, thus set forth in general terms, is illustrated in the accompanying drawings, forming part hereof, in which—

Figure 1 is a perspective view of a fodder-cutter blower and its discharge pipe, in operative position; Fig. 2, a vertical section in the median line of the discharge pipe, the lateral deflector and the deflecting hood; and Fig. 3 a similar view of a modified form of the lateral deflector and the deflecting hood.

Similar numerals refer to similar parts throughout the drawings.

The discharge pipe is composed of one or more sections 1 of round pipe, preferably made of sheet metal with the longitudinal seam 2 on one side; the upper end portion of each section and the neck 2ª of the blower outlet being sufficiently tapered to neatly telescope within the lower end portion of the adjoining section above, thus forming a telescoped joint.

The lateral deflector on the discharge pipe in the preferred form shown in Figs. 1 and 2 is made rectangular in cross section, each side of the lower end thereof being approximately the same width as the diameter of the discharge pipe, so that the opening in the lateral deflector is somewhat larger than the opening in the discharge pipe; and the joint between the round discharge pipe and the square lateral deflector is preferably composed of the sheet metal ring 17 and the cast fitting made of four quarter-sections 18, all bolted or riveted together.

Lateral deflector 16 or 16ª on the discharge pipe is curved upwardly and laterally about ninety degrees. When the lateral deflector is made in the form of a pipe, as shown in Figs. 1 and 2, its cross area of the pipe is gradually increased by increasing its radial depth or diameter from its lower to its upper end, which increase in the cross area is designed to prevent a clogging of the fodder in the pipe while being deflected from the upward to the lateral direction; and the corners of this portion of the pipe are preferably formed or reinforced by the angle bars 36, which renders external bracing unnecessary.

The deflecting hood 37 of the funnel hopper 39 is likewise preferably formed rectangular in cross section, but the lower side of this hood is formed open so that the silage is free to drop downward after leaving the upper end of the lateral deflector. The upper end of the deflecting hood 37 is telescoped over the upper end of the lateral deflector division 16, and the parts are jointed together by the pivot bolts 38 passed through the overlapping sides adjacent to the lower corners thereof; on which pivot bolts the deflecting parts are free to rotate, with respect to each other, to vary the angle of the joint and permit a variation in the relation of the parts on each side of this joint.

The funnel hopper 39 is secured to the lower end of the deflecting hood 37 as by the bolts 40, and from the inner side of this hopper is extended the inclined trough 41, the upper end 42 of which extends under the upper end of the discharge pipe; while the sides of the trough are extended along the sides of the overlapping portions of the deflecting hood and the lateral deflector and are secured on the pivot bolt 38 thereof; whereby the trough forms an inclined bottom for the deflecting hood, and receives and guides into the hopper all the silage which is discharged from the upper end of the discharge pipe, or which may drop from the open under side of the deflecting hood, so that all the silage is deflected or guided into the hopper 39.

The lateral openings between the lower edges of the sides of the deflecting hood and the upper edges of the sides of the inclined trough, serve to permit an escape of the air from the blower, and, if need be the silage, in event the discharge spout should be closed at its lower end or otherwise clogged. The trough and its connections furthermore form a brace for the deflecting hood, which hood is curved laterally and downward from its upper end to the hopper, and the upper corners thereof are also strengthened by the angle bars 43, whereby the free end of this hood is stiffened against any vertical bending.

The upper sides of the adjoining ends of the deflecting parts thus hinged together by the pivot bolt 38 at the lower side thereof, are connected together by the adjusting mechanism 44 which is preferably of the character fully described and set forth in Letters Patent No. 877,304, dated January 21, 1908, issued to me; which adjusting mechanism is adapted to be operated by the pulley rope 45 and serves to adjust the angle of the hinged joint at the apex of the arch formed by the lateral deflector and the deflecting hood.

The discharge spout is composed of a series of sections of round sheet metal pipe, each section being preferably made about thirty inches long and being tapered from a larger upper end to a smaller lower end to such an extent that each section, excepting about four inches of the upper end, will freely telescope and nest within the adjoining section below.

The pipe sections 46 are connected together by a pair of diametrically opposite flexible links 47, which, as shown, are preferably in the form of chains, for each joint, the connecting links of alternate joints being located in cross diameters, and the parts being so proportioned that the smaller end of each upper pipe will enter a short distance, say about three inches, into the larger end of the next lower section, whereby flexible joints are formed between the several sections and the lower end of the discharge spout can be swung to discharge the silage in various directions.

The improved discharge spout composed of a series of slightly tapered pipe sections with specially designed flexible and detachable connecting links, to permit a free flexion and a ready detachment or telescoping of the several sections of the pipe, which is illustrated and described, but not claimed herein, is made the subject-matter of a divisional application for Letters Patent filed June 29, 1912, Serial No. 706,621.

I claim:

1. In a fodder-cutter or the like, a blower, a discharge pipe leading upward from the blower with a laterally curved deflector thereon, and a downwardly curved deflecting hood connected to the lateral deflector and having a hopper on its lower end with an inclined trough extending under the deflecting hood.

2. A funnel hopper for the discharge pipe of a fodder-cutter blower or the like having a curved deflecting hood thereon and an inclined trough extending under the deflecting hood.

JOSEPH DICK.

Witnesses:
 Ferd. J. Zettler,
 Ruth A. Miller.

---

Copies of this patent may be obtained for five cents each, by addressing the "Commissioner of Patents, Washington, D. C."